United States Patent [19]

Briggs et al.

[11] Patent Number: 4,798,526
[45] Date of Patent: Jan. 17, 1989

[54] MODULAR EXTRUSION HEAD

[75] Inventors: Milton Briggs, York, Pa.; Erich O. Teutsch, Marietta, Ga.

[73] Assignees: General Electric Company; Graham Engineering Corporation

[21] Appl. No.: 922,198

[22] Filed: Oct. 23, 1986

Related U.S. Application Data

[63] Continuation of Ser. No. 886,734, Jul. 17, 1986, abandoned, and a continuation of Ser. No. 878,701, Jun. 26, 1986, abandoned.

[51] Int. Cl.⁴ ............ B29C 47/06; B29C 47/26; B29C 47/28; B29C 47/78
[52] U.S. Cl. .................. 425/113; 264/173; 264/515; 425/133.1; 425/192 R; 425/380; 425/462; 425/467; 425/532; 425/379.1
[58] Field of Search ............ 264/173, 514, 515; 425/113, 133.1, 192 R, 379 R, 380, 462, 467, 532, 131.1

[56] References Cited

U.S. PATENT DOCUMENTS

| | | | |
|---|---|---|---|
| 2,893,056 | 7/1959 | Henning | 425/113 |
| 3,039,142 | 6/1962 | Zavasnik | 425/378 R X |
| 3,308,508 | 3/1967 | Schrenk . | |
| 3,345,690 | 10/1967 | Hagen . | |
| 3,611,495 | 10/1971 | Langecker | 425/467 X |
| 3,635,624 | 1/1972 | Nakakoshi et al. . | |
| 3,694,292 | 9/1972 | Schippers et al. | 425/467 X |
| 3,802,826 | 4/1974 | St. Eve | 425/462 |
| 3,949,042 | 4/1976 | Utz | 264/173 |
| 4,044,086 | 8/1977 | McChesney et al. . | |
| 4,047,868 | 9/1977 | Kudo et al. | 425/133.1 |
| 4,056,344 | 11/1977 | Lemelson | 425/380 X |
| 4,144,011 | 3/1979 | Sponaugle | 425/192 R |
| 4,280,801 | 7/1981 | Wheeler, Jr. et al. | 425/113 |
| 4,344,907 | 8/1982 | Herrington | 264/173 |
| 4,365,949 | 12/1982 | Nash | 425/463 |
| 4,421,465 | 12/1983 | Herrington | 425/133.1 |
| 4,436,778 | 3/1984 | Dugal | 428/36 |
| 4,472,129 | 9/1984 | Siard | 425/381 |
| 4,484,883 | 11/1984 | Honda et al. | 425/462 |
| 4,522,775 | 6/1985 | Briggs et al. | 264/173 |
| 4,578,025 | 3/1986 | Ando et al. | 425/133.1 |

FOREIGN PATENT DOCUMENTS

| | | | |
|---|---|---|---|
| 297306 | 7/1971 | Austria . | |
| 063060 | 10/1982 | European Pat. Off. . | |
| 110493 | 6/1984 | European Pat. Off. . | |
| 183905 | 6/1986 | European Pat. Off. . | |
| 1952329 | 7/1970 | Fed. Rep. of Germany | 264/515 |
| 2345049 | 3/1975 | Fed. Rep. of Germany | 425/379 R |
| 3044535 | 6/1982 | Fed. Rep. of Germany . | |
| 51-28668 | 8/1976 | Japan | 425/133.1 |
| 52-51464 | 4/1977 | Japan . | |
| 54-15891 | 6/1979 | Japan | 425/133.1 |
| 56-24133 | 3/1981 | Japan . | |
| 57-61524 | 4/1982 | Japan | 425/113 |
| WO/81/002-31 | 2/1981 | PCT Int'l Appl. . | |

OTHER PUBLICATIONS

Battenfeld Fischer Flyer, Aug., 1985.
Sano Design & Machine Co., Inc. Flyer.
Abstract of Japanese Patent Application 57-43849.

Primary Examiner—Jeffery Thurlow
Assistant Examiner—Leo B. Tentoni
Attorney, Agent, or Firm—Thomas Hooker

[57] ABSTRACT

A modular extrusion head is disclosed including a plurality of cross head die modules, each including a flow path for a single resin. Molten resin layers are flowed from the modules onto a stepped mandrel and then along the mandrel and out an extrusion die to form a multi-layer parison. The layers are thin, with a uniform thickness and hole free. The modules are temperature zoned to permit flowing of a low temperature resin to and along the mandrel in contact with a high temperature resin without impairing the properties of the low temperature resin.

36 Claims, 5 Drawing Sheets

MODULAR EXTRUSION HEAD

This application is a continuation of copending applications Ser. No. 886,734, filed July 17, 1986, now abandoned, for Modular Extrusion Head, Method, Intermediate Product and Product and Ser. No. 878,701, filed June 26, 1986, now abandoned, for Modular Extrusion Head.

BACKGROUND OF THE INVENTION

1. Field of the Invention

The invention relates to resin extrusion and particularly to extrusion heads and methods for extrusion of single and multi-layer resin parisons, and an intermediate product and products formed from the parison.

2. Brief Description of the Prior Art

Commercially available thermoplastic resins are extruded at temperatures specific to the particular resin. In order to maintain the properties of the resin, the flow temperature during extrusion must be within a predetermined temperature range for the resin. The properties of the resin may be degraded when the resin is heated appreciably above its flow temperature.

Prior extrusion heads are incapable of forming a parison having a layer of undegraded low flow temperature resin adjacent a layer of high flow temperature resin where the properties of the low temperature resin would be degraded if the resin were heated to the flow temperature of the high temperature resin. Heat supplied to the head by the high temperature resin raises the temperature of the flow path of the low temperature resin and heats this resin sufficiently to degrade its properties. This limitation in conventional extrusion heads has prevented the manufacture of parisons with adjacent undegraded layers of high and low temperature thermoplastic resin and the manufacture of blow molded and other types of articles from such parisons.

Parisons may be extruded with a barrier resin layer and tie resin layers on either side of the barrier layer for bonding the barrier layer to the surrounding support layers. The barriers resin is considerably more expensive than the support layer resins which, for example, may be polyolefins or polycarbonate. Because of the cost of the tie and barrier layers, the industry has attempted to reduce the thickness of these layers. Successful reduction of layer thickness requires accurate control over the extrusion process to assure each thin layer is of uniform thickness and continuous, that is, free of holes. Holes in a tie layer prevent desired adhesion between the barrier layer and the adjacent structural layer. Holes in the barrier layer destroy the barrier properties of the product formed from the parison. Extrusion of these very thin layers is made difficult by the necessity of eliminating knit lines and preventing heat degradation of the low temperature resins while in the extrusion head.

Co-extrusion heads receive heated, softened and plasticized resins from individual extruders through inlet ports, flow the resin on to the mandrel and then on the mandrel through an annular mouth. Successive layers are flowed onto the mandrel. A multi-layer parison is extruded out of the mouth of an extrusion die. The die may be modulated to vary the thickness of the parison as required to assure that the blow molded product has a uniform wall thickness relative to blow ratios.

Conventional co-extrusion heads define flow paths for each resin in an integral assembled head. The positions of the flow paths in the head are fixed and cannot be changed. Each flow path must be used at its intended location within the head. Conventional co-extrusion heads flow parison layers on cylindrical, constant diameter mandrels.

In extrusion cross head dies it is conventional to flow the resin first around the mandrel and into an equilibration chamber spaced from the mandrel. Resin flows from this chamber along a generally conical transfer passage to a mouth located axially downstream from the chamber and opening into an extrusion channel at the mandrel. The cross sectional flow area of the transfer passage decreases from the chamber to the mouth, thereby increasing resistance to the flow of the resin and undesirably increasing the temperature of the resin.

SUMMARY OF THE INVENTION

The extrusion head of the invention is modular with a number of like cross head die modules stacked together and confined between two clamp plates. Each die module has a fixed diameter central bore. A stepped mandrel mounted on one plate extends through the bores and has radial inward steps located at die module mouths. The steps increase the flow area of the extrusion channel between the mandrel and the bore to accommodate resin flowing into the channel.

The modular construction of the die module permits use of individual modules to make an extrusion head for forming a mono-layer or multi-layer parison with a number of layers as required. The flow paths in the modules may differ to accommodate flow of different types or outputs of resin. The order of the individual modules may be changed without modification of the modules, as may the number of modules.

The modules are separated from each other by annular air spaces. These spaces prevent heat from a module flowing a high temperature resin from raising the temperature of an adjacent module flowing a low temperature resin. In this way, low temperature resins, typically barrier and tie resins, are flowed onto the mandrel at their low optimum flow temperatures without temperature degradation. Heaters on the outer circumferences of the modules supply heat to the modules during start up. In one embodiment copper envelopes on the outside surfaces of the modules facilitate the flow of heat to and from the module flow paths. In another embodiment insulating discs in the center of the air spaces further thermally isolate the modules.

The flow path within each module includes a conical transfer passage running from an equilibration chamber to the annular mouth of the module at the mandrel with a uniform flow cross section along its length as the passage extends downstream and radially inwardly toward the mouth. The uniform flow cross section aids in maintaining the resin flowing along the path at the desired flow temperature until it reaches the extrusion channel.

The flow path in each module is compact with a high throughput rate, thus reducing residence time and avoiding resin degradation.

Changeovers of resin material may be made without disassembly of the modules of purging with special purging components.

Each module may be provided with its own temperature control system allowing for temperature zoning and variation within the module according to the need of each resin layer.

The resin layers flowing into the extrusion channel contact other resin layers in the channel to form a moving, intermediate product. The rapid rate the intermediate product flows down the channel and out the mouth of the extrusion head and the insulating properties of the resin layers maintain temperature gradients across the interfaces between the layers until the layers are extruded. Low temperature layers are not heated and degraded by contact with adjacent high temperature layers.

The intermediate product is extruded from the head as a parison. In the event the parison is supplied to a blow molding machine the parison cools during blow molding to form an article. In tube manufacture, the parison is cooled in a liquid. In film manufacture, the parison is expanded by air and cooled. In sheet manufacture the parison is slit and cooled when passed through chilled rollers.

The modular design of the co-extrusion head has a reduced axial length over conventional heads and high flow rates, thus reducing the residence time for resin within the head and minimizing the risk of resin degradation.

The features of the disclosed extrusion head permit extrusion of parisons with thin, uniform thickness cylindrical and continuous or hole free layers of undegraded resin, particularly expensive tie and barrier resins. The thickness of these layers in a resultant blown product depends upon the modulation of the extrusion die and the blow ratio. In some cases, a blow molded article formed from a multi-layer parison extruded from the disclosed head may have a barrier layer 0.001 inch thick and surrounding continuous tie layers 0.0005 inch thick.

The invention is primarily useful in extruding a parison for use in blow molding articles, typically liquid and food containers. The invention is also useful in the manufacture of tubing, film, sheeting and injection molded articles.

Other objects and features of the invention will become apparent as the description proceeds, especially when taken in conjunction with the accompanying five sheets of drawings illustrating four embodiments of the invention.

BRIEF DESCRIPTION OF THE DRAWINGS

FIG. 4a is a representational partial cross-sectional view illustrating the flow of resin into and along the extrusion channel of the head;

FIGS. 4b, 4c, 4d, 4e and 4f are enlarged views of portions of FIG. 4a;

DETAILED DESCRIPTION OF THE PREFERRED EMBODIMENT OF THE INVENTION

Figure 1:
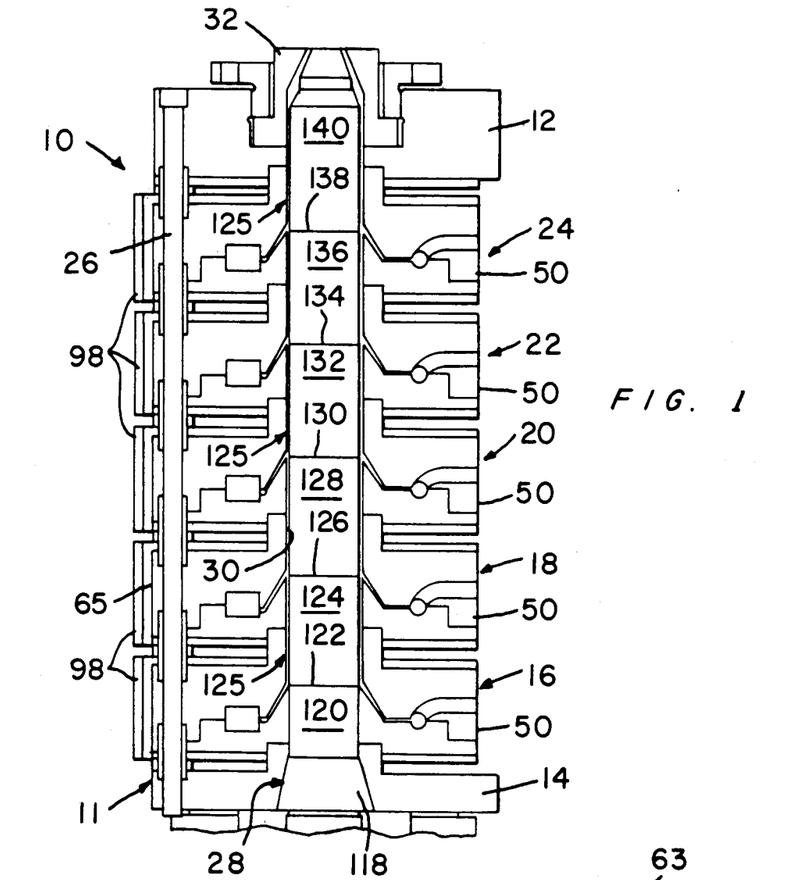
FIG. 1 is a sectional view illustrating a first embodiment five-layer modular co-extrusion head according to the invention.

Modular co-extrusion head 10 is illustrated in FIGS. 1 through 6. The body 11 of head 10 includes clamp plates 12 and 14 and a number of like cross head die modules 16, 18, 20, 22 and 24 clamped between the plates 12 and 14 by a plurality of tie bolts 26, only one of which is illustrated in FIG. 1. A tapered stepped cylindrical mandrel 28 is mounted in upstream clamp plate 14 and extends downstream through a cylindrical bore 30 extending through modules 16, 18, 20, 22 and 24 and plate 12 to an extrusion die 32 mounted on plate 12.

Die 32 is of conventional design and includes a die bushing 34 defining the end of bore 30 and a die pin 36 mounted in a bore in the end of stem 38 fitted in mandrel 28. A blow passage 40 extends through stem 38 and die pin 36. During operation of head 10 bore 40 is connected to a supply of gas which is flowed through the die pin and into the interior of the extruded parison to prevent collapse of the parison. An annular accumulation recess 42 is provided in the extrusion die 32 upstream of mouth 43 between the bushing, the end of the mandrel and the die pin.

Figure 2:
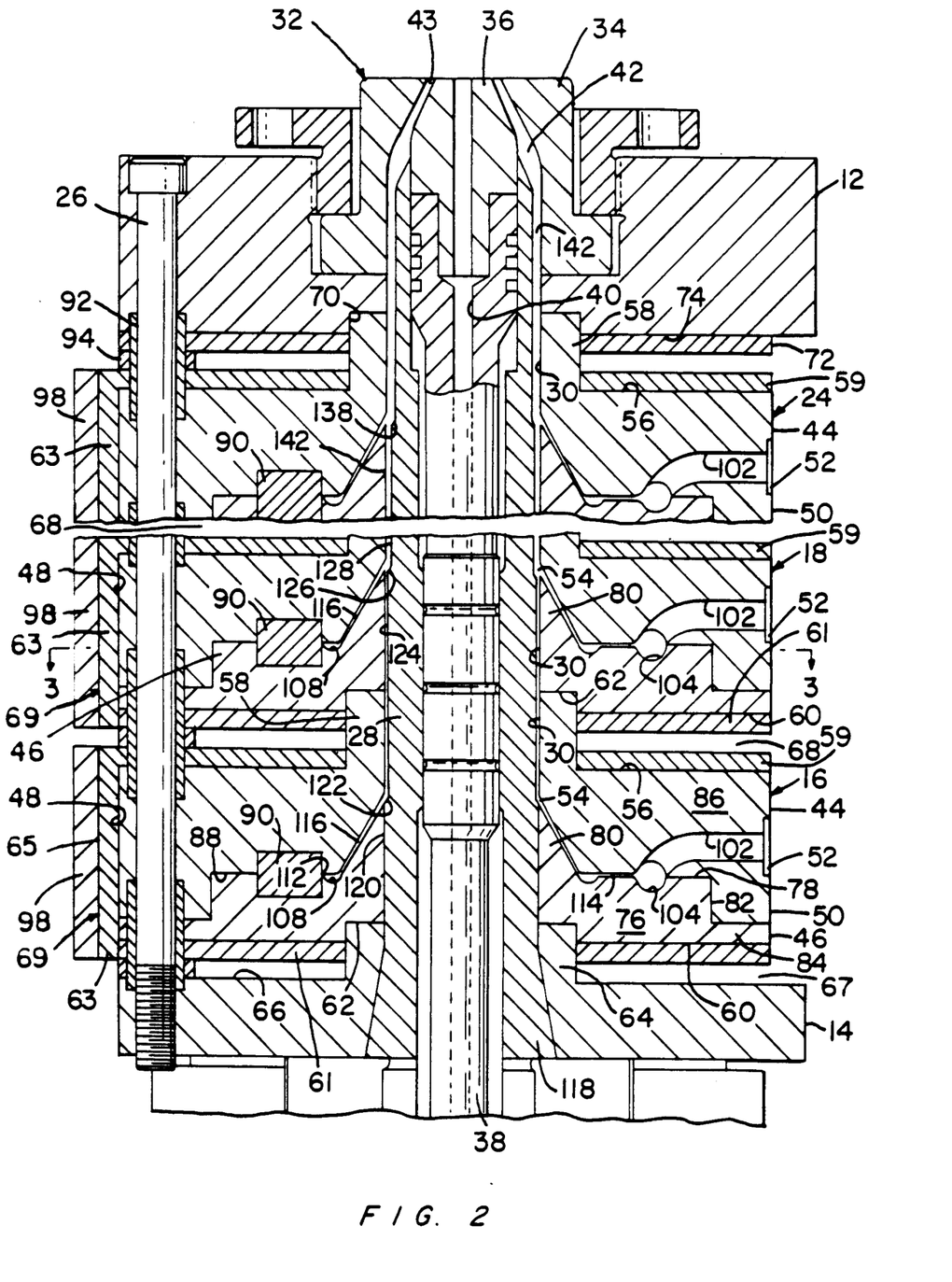
FIG. 2 is an enlarged view of FIG. 1, partially broken away.

The five module assemblies 16, 18, 20, 22 and 24 each define a flow path for heated, softened and plasticized thermoplastic resin forming one layer of the parison extruded from the head. The modules each include downstream and upstream module plates 44 and 46 having a generally cylindrical outer circumferential surface 48 with the exception of a flat 50 on one side of the module. As shown in FIGS. 1 and 2, all flats 50 may be aligned on one side of the head. The flow path in each module extends from a inlet port 52 on flat 50 through interior passages of the module to a 360° mouth 54 located on the portion of bore 30 extending through the module. Inlets 52 are connected to individual screw-type extruders which flow heated, softened and plasticized thermoplastic resin to the modules at appropriate individual flow rates temperatures and pressures for formation of the multi-layer parison.

The downstream module plate 44 includes flat surface 56 facing downstream and a small diameter cylindrical neck 58 concentric with the mandrel axis and projecting above surface 56. The upstream module plate 46 includes a flat surface 60 facing upstream and a small diameter cylindrical recess 62 surrounding and concentric with the mandrel axis.

Figure 3:
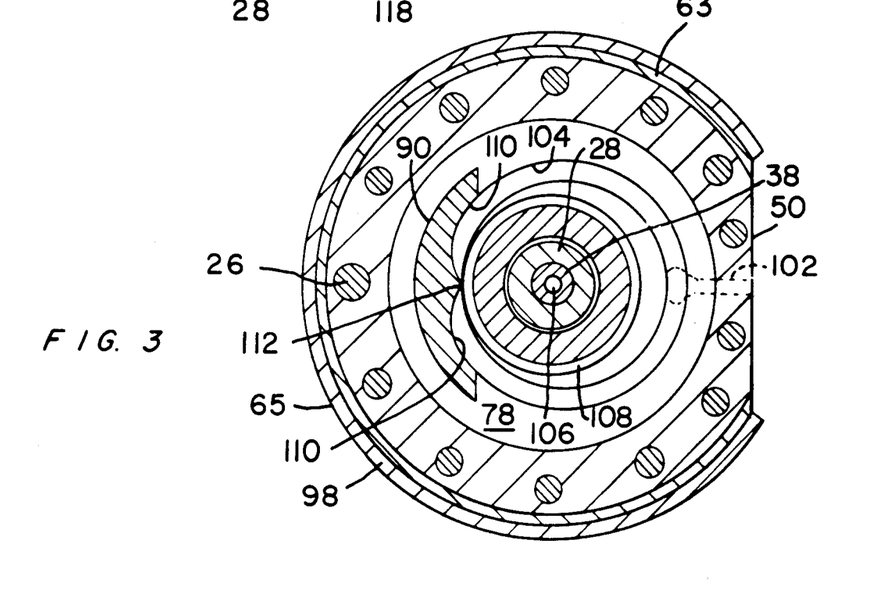
FIG. 3 is a sectional view taken along line 3—3 of FIG. 2.

Module plates 44 and 46 are preferably formed from steel. Copper plates 59 and 61 are secured to plate surfaces 56 and 60. A partially cylindrical copper plate 63 is secured to the outer cylindrical surface 48 of the module. Plate 63 extends around the module away from flat 50 as illustrated in FIG. 3. Plates 59, 61 and 63 form a copper envelope surrounding the outer surfaces of the module.

The upstream clamp plate 14 is provided with a narrow cylindrical neck 64 concentric with the mandrel axis and having a close fit within the recess 62 of module 16. Both necks 58 and 64 are located adjacent the passage 30, radially inwardly of the outer circumference of the body 11. As shown in FIG. 2, the length of neck 64 is greater than the depth of the recess 62 to define an annular air space 67 between copper plate 61 and adjacent surface 66 of plate 14.

Adjacent modules are aligned coaxially with mandrel 28 with the neck 58 of each module plate 44 seated within the recess 62 of the next downstream module plate 46 as illustrated. The necks are longer than the depths of the recesses to define annular air spaces 68 between adjacent modules. The neck 58 of downstream module 24 is fitted within cylindrical recess 70 of downstream clamp plate 12 to define an annular air space 72 between module plate 59 and copper plate 74 on plate 12. All of the air spaces surround the necks and extend radially outwardly to the body circumference 65.

Each upstream plate 46 includes a thick disc 76 between walls 60 and 78 which extends perpendicular to the mandrel axis and a downstream projecting conical portion 80 having a interior cylindrical surface forming part of bore 30 and an exterior surface lying on the frustrum of a cone. The outer circumference of disc 76 is defined by cylindrical step 82 and exterior flange 84.

Each downstream module plate 44 includes a thick disc 86 with neck 58 extending downstream from the disc and an interior surface of the disc including a cylindrical portion forming part of bore 30 at the neck 58 and a surface on the frustrum of a cone spaced a distance from the conical surface of portion 80 of plate 46. A cylindrical recess 88 is formed on the upstream surface of disc 86 so that when the plates are mounted together disc 76 extends into or nests in the recess 88 within disc 86, the two plates are held coaxial to the mandrel axis, and the flange 84 is flush on the outer surface of the disc 86 as illustrated. A flow control insert 90 is confined in recesses in discs 76 and 86 opposite inlet 52. The insert extends across the interface between the two plates, as illustrated generally in FIG. 2.

Tie bolts 26 hold the nested modules together in the head in axial alignment with the mandrel axis. These bolts extend through appropriate alignment bushings 92 and spacer bushings 94 as illustrated in FIG. 2.

In each module a circumferential electric resistance heater 98 is secured to the outer surface of conductive plate 63 and extends around the module between the ends of flat 50. During start up the envelope 69 facilitates the flow of heat from heater 98 to the flow path in the module. It also facilitates dissipation of excess heat from the module by convection cooling in the air spaces. An increase in temperature results from pressure drop as the resin flows through the module.

The flow path for resin through each module includes an inlet passage 102 in plate 44 running from inlet 52 to a circular primary distribution channel 104 extending eccentrically around the mandrel axis 106 and bore 30. As illustrated in FIG. 2, primary distribution channel 104 is formed in the adjacent faces of the module plates 44 and 46 and is circular in radial cross section away from insert 90. A circular equilibration or decompression chamber 108 concentric with axis 106 is formed in plate 46 at the base of conical portion 80. Channel 104 is tangent to chamber 108 at a point 180° from inlet 52. The eccentric primary distribution channel 104 is spaced from chamber 108 at inlet passage 102 as shown in FIG. 3. Insert 90 is fitted within recesses in the two plates 44 and 46 at a location opposite from inlet passage 102 and includes concave single curvature walls 110 extending across the channel 104 to gradually decrease the radial cross sectional area of the primary distribution channel, beginning 30° to either side of the 180° position. The insert completely closes the channel 104 at cusp 112 defined by the inter-sections of the walls and located at the 180° position.

The primary distribution channel and the equilibration chamber are communicated by narrow circumferential gate passage 114. The radial length of gate passage 114, as measured from axis 106, smoothly decreases to either side of the inlet passage 102 from a maximum at the inlet passage to minimum of zero at the tangent point 180° from the inlet passage. If required, an annular fluid sealing gasket may be provided in the interface between plates 44 and 46 outside of the primary distribution channel. The gasket may be required to prevent resin from seeping radially outwardly along the interface.

The interior and exterior conical surfaces of plates 44 and 46 define a conical transfer passage 116 communicating the equilibration chamber 108 and mouth 54. The passage extends downstream and radially inwardly from the chamber 108 to the smaller diameter mouth 54 on bore 30.

The width of passage 116 increases from chamber 108 to mouth 54 so that the cross sectional area of the passage perpendicular to the direction of flow of resin through the passage is uniform despite the decrease in the radius of the passage from the chamber to the mouth. The walls defining the passage preferably lie on conical surfaces. In order to assure a uniform flow cross section along the length of passage 116 it is necessary that the half angle of the cone defining the interior surface is greater than the half angle of the cone defining the outer surface.

Figure 6:
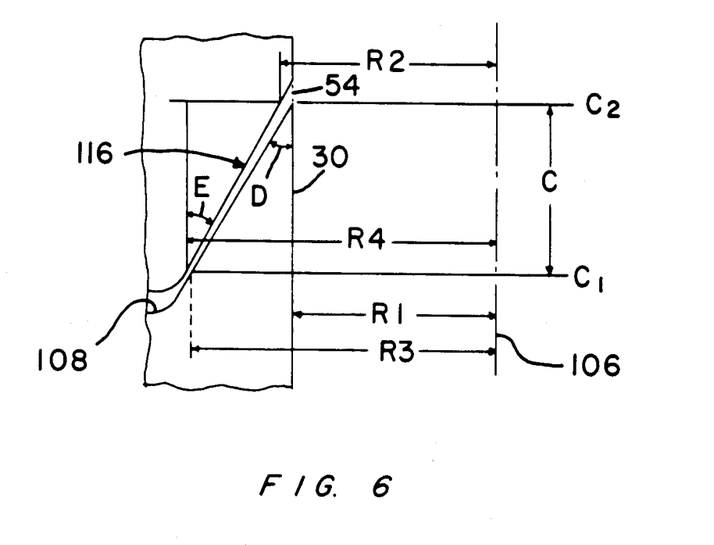
FIG. 6 is a diagrammatic view showing the geometry of a portion of a module flow path.

The relationship between the two conical half angles required to assure the uniform flow cross section area along the passage may be understood with reference to FIG. 6 where radial distances (R) are measured outwardly from mandrel axis 106 at levels $C_1$ and $C_2$ separated apart a distance C along the axis. The area of the annulus between the walls of the passage 116 at level $C_1$, a short distance downstream from chamber 108, is:

$$\text{area}_1 = (Pi)(R4-R3)(R4+R3)$$

where $R_3$ is the inner radius of the annulus, $R_4$ is the outer radius of the annulus and (pi) is the ratio of the circumference of a circle to its diameter.

The area of the annulus at downstream position $C_2$ is:

$$\text{area}_2 = (pi)(R_2 - R_1)(R_2 + R_1)$$

where the $R_2$ is the outer radius of the annulus and $R_1$ is the radius of bore 30.

Angle D is the half angle of the cone of the inner surface of passage 116 and angle E is the half angle of the cone of the outer surface of the passage. Given the axial distance C, the half angle of one cone, the desired radii for one annulus and one radius for the other annulus the remaining half angle and radius may be calculated using the area formulas and the formulas for the tangents of angles D and E:

$$\text{Tan } D = \frac{R_3 - R_1}{C} \text{ ; and Tan } E = \frac{R_4 - R_2}{C}$$

The two annuluses at $C_1$ and $C_2$ lie in planes perpendicular to axis 106 and are not perpendicular to the direction at flow of resin through passage 116. The cross-sectional flow areas of the passage 116 at positions $C_1$ and $C_2$ are directly proportional to the areas of the anuluses so that the passage has a uniform flow cross sectional area when the area at $C_1$ equals the area at $C_2$.

In head 10, the conical half angle D for the interior surface of the passage 116 is 30° and the smaller half angle E for the exterior surface of the passage required to provide the constant cross section of flow area is 27°16'.

Stepped mandrel 28 includes a tapered head 118 securely mounting the mandrel in upstream clamp plate 14 for proper axial orientation with respect to the cross head die modules, downstream clamp plate 12 and extrusion die 32. The exterior surface of the mandrel downstream from head 118 includes a first cylindrical section 120 having a radius equal to the radius of bore 30 and a close fit within the bore of module 16 plate 46. A radial inward step 122 located across from mouth 54 of module 16 joins the downstream end of surface 120 to reduced radius cylindrical surface 124. The diameter of cylindrical surface 124 is less than the diameter of surface 30 to define the upstream end of a cylindrical extrusion channel 125 extending downstream toward die 32. Across from mouth 54 of module 18 a radial inward step 126 joins the downstream end of surface 124 to the upstream end of a smaller radius cylindrical surface 128. Cylindrical surface 128 extends from step 126 to step 130 across from the mouth of module 20. A reduced diameter cylindrical surface 132 extends from step 130 to step 134 across from the mouth of module 22. The reduced diameter cylindrical surface 136 extends from step 134 to step 138 across the mouth of module 24. A final reduced diameter surface 140 extends from step 138 to the end of the mandrel in the extrusion die 32. The steps and surfaces are best illustrated in FIGS. 1 and 2 of the drawings. All of the steps are smoothly blended with the adjacent surfaces to avoid sharp corners or valleys and lie on conical surfaces having 30° half angles. Extrusion channel 125 extends the length of the mandrel and increases in width at each step.

The annular air spaces 67, 68 and 72 are open at the outer circumference of head 10 and extend radially inwardly to the respective necks 58 and 64. The air spaces extend radially inwardly past the inlet passages 102, primary distribution channels 104, and gate passages 114. The bottoms of the air spaces as defined by the necks, are located approximately the same radial distance from the mandrel axis 106 as the equilibration chambers 108. The copper envelopes 69 extend along the full radial depth of the recess.

Modular co-extrusion head 10 extrudes a cylindrical parison having five continuous circumferential resin layers of different or the same thickness as required by the particular application. The layers may be formed from thermo-plastic resins having different properties and optimum work or flow temperatures as required. An extruder for each resin forming a layer in the parison is connected to the inlet 52 of each module in the head and adjusted to supply a flow of resin to the module at the optimum flow temperature for the resin and at an appropriate pressure and flow rate. During start up heaters 98 heat their respective modules to the flow temperatures for the resins flowing through the modules.

The heated and pressurized plastic from the extruder flows through inlet passage 102 and into both branches of the primary distribution channel 104. The narrow gate passage 114 permits increased flow of the plastic through the gate and into the equilibration chamber 108 as the plastic flows circumferentially around both branches of the primary distribution channel 104. Insert surfaces 110 reduce the radial cross sectional area of the primary distributon channel to zero at the 180° position and direct the flow of plastic inwardly toward the equilibration chamber 108. The reduction in length of the gate passage away from inlet 114 and the reduction in cross sectional area of the primary distribution channel by the insert walls 110 cooperate to provide a circumferentially uniform radial inward flow of plastic through the gate passage and into the cylindrical equilibration or decompression chamber 108. The resin in channel 104 does not eddy or stagnate and is not heat degraded.

The cross sectional flow area of chamber 108 is greater than that of the gate passage 114 to assure that any pressure gradients in the resin in the chamber are equilibrated. equilibraion assures that the resin in the conical transfer passage 116 is at a uniform pressure as it flows toward mouth 54. The ends of the branched flow along channel 104 join without a knit line, under proper conditions.

The controlled temperature of the resin flowing through the module permits formation of a uniform continuous layer of resin on the mandrel and in the resultant extruded parison. The constant flow cross sectional area of the conical transfer passage 116 results in a uniform volumetric flow of resin to the mouth without increase or decrease in the temperature of the resin due to a reduction or increase in the cross sectional area of the passage.

The temperatures and pressures of the resins flowing through the die head modules and onto the mandrel are carefully controlled. The pressure at which each resin is flowed onto the mandrel is controlled by adjusting the operation of the extruder for the module. The temperature of the resin flowing onto the mandrel is controlled by use of heaters in the extruder and also by applying heat as required to the module by heater 98. The copper envelopes 69 rapidly conduct the heat inwardly from the heaters to the resin flow paths between plates 44 and 46. Excess heat is dissipated by convection cooling in the air spaces. The air spaces also prevent heat in one module from degrading resin in an adjacent module. Air circulating in the air spaces carries away heat.

Resin flows along passage 116 of module 16, past mouth 54 and step 122 and continues downstream in a single layer cylindrical flow along the extrusion channel 125. The cross sectional flow area of this part of the channel may be the same as the cross sectional flow area of the conical transfer passage 116 of module 16. At mouth 54 of module 18 resin flowing from the module passage 116 flows on top of the molten resin from module 16 already flowing along channel 125. At this mouth 54 step 126 decreases the diameter of the mandrel to increase the cross sectional flow area of the channel to accommodate the new resin layer. The decrease in diameter of the surface 128 may be slightly greater than the thickness of the flow passage at surface 124 to assure the proper increase in flow area.

The resin from modules 20, 22 and 24 are likewise flowed onto the previous resin layers already on the mandrel are moved radially inwardly at the steps at each module mouth. Downstream of step 138 the extrusion channel has a maximum width and confines a body of resin comprising five discreet and continuous cylindrical layers.

The layers of resin in intermediate product 152 filling stepped extrusion channel 125 move laminarily downstream along the channel, although the velocity at which the resin flows along the channel may vary between adjacent module mouths 54, dependent upon the relative pressures at which resins are flowed into the channel. Laminar flow aids in maintaining the continuity of the individual resin layers so that the layers in the resultant parison are continuous or free of holes even when individual layers are very thin.

The open annular air spaces 67, 68 and 72 permit each module to be zoned or maintained at a flow temperature appropriate for the particular resin flowing through the module, independent of the temperature of adjacent modules. In the event a high temperature module is adjacent a low temperature module, the air space between the two modules permits heat to be dissipated from the high temperature module by convection cooling without raising the temperature of the adjacent low temperature module. The radial depth of the air spaces facilitates zoning and heat dissipation.

Figures 4A, 4B, 4C, 4D, 4E, 4F:
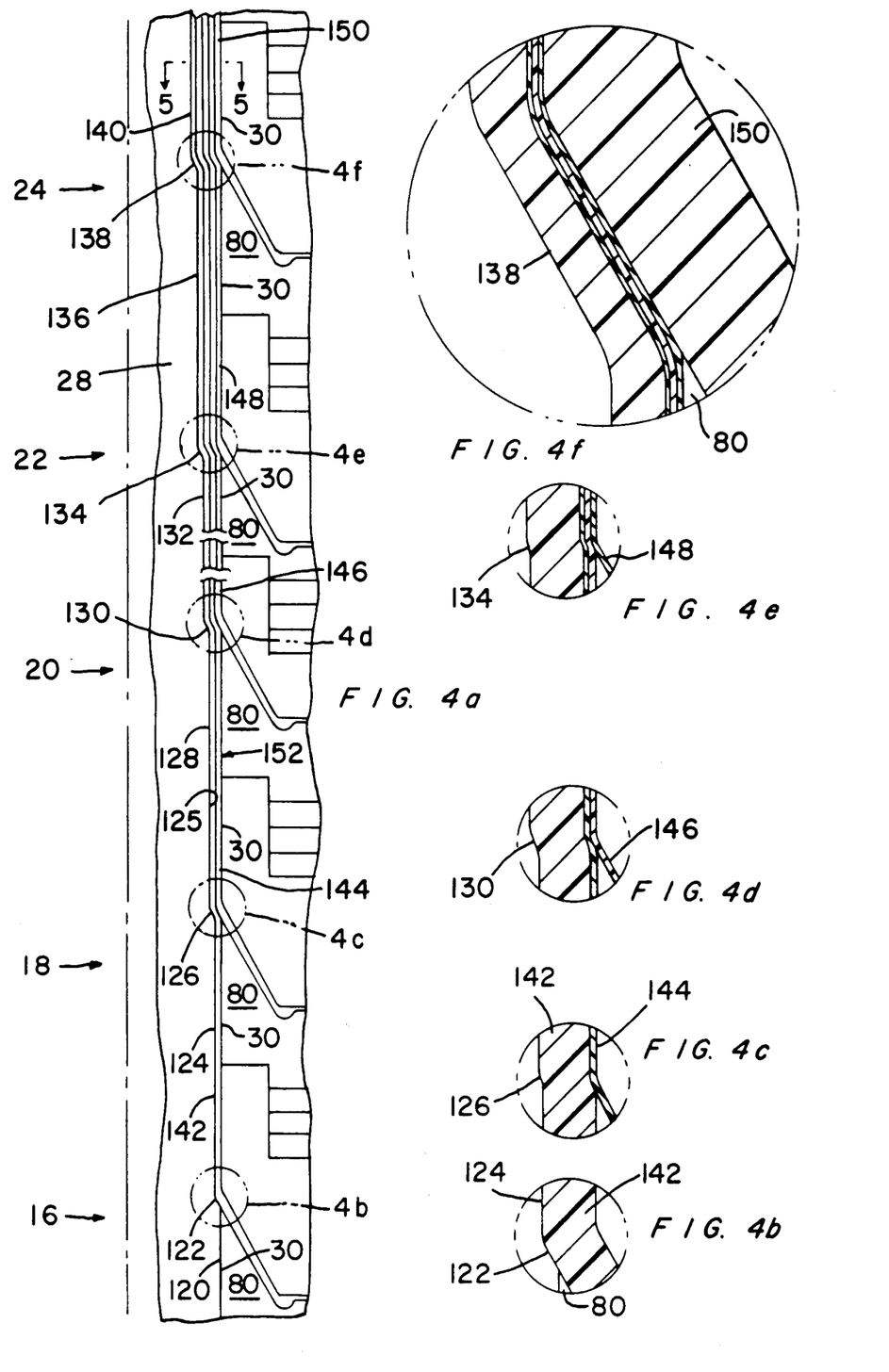

During operation of head 10, each module 16, 18, 20, 22 and 24 supplies a continuous cylindrical layer of resin to the stepped cylindrical extrusion channel 125 located between stepped surface of mandrel 28 and cylindrical bore 30. The formation of this multi-layer intermediate product is best understood with reference to FIGS. 2 and 4.

The resin is supplied to module 16 at a controlled flow rate, temperature and inlet pressure and passes along conical transfer passage 116, past mouth 54 and into the upstream end of the extrusion channel 125 at step 122 to form a cylindrical inner layer 142 of resin on the mandrel. The inner resin layer 142 moves downstream along the mandrel until it reaches step 126 opposite mouth 54 of module 18. Resin at a controlled flow temperature and pressure flows from the mouth of the module 18, into channel 125 and onto the inner layer of resin, as illustrated in FIG. 4a, to form a second cylindrical layer 144 of molten resin on the mandrel overlying the inner layer of resin 142. Step 126 is located opposite mouth 54 of module 18 to provide adequate room for the inner layer 142 to be moved radially inwardly on the mandrel as the second layer 144 is flowed onto the mandrel. In similar fashion, resin layers flowing from modules 20, 22 and 24 at independently set flow temperatures and pressures contact and overlie the previously flowed layers on the mandrel and move these layers radially inwardly at steps 130, 134 and 138 to flow third, fourth and fifth cylindrical resin layers 146, 148 and 150 onto the intermediate product 152 flowing downstream along cylindrical extrusion channel 125 as illustrated.

The intermediate product 152 in channel 125 includes a number of successive cylindrical layers of resin each at an optimum flow temperature for the particular resin, substantially independent of the temperature of adjacent resin layers. Resin is not a good thermal conductor. The intermediate product 152 moves downstream along the mandrel rapidly at a rate as high as 1.6 feet per second. The axial distance from the first step 122 to the mouth 43 is relatively short, about 15 inches. By moving the different temperature insulating layers of resin along the mandrel at this relatively rapid rate the intermediate product is extruded out mouth 43 to form the parison without the high temperature layers heating and injuring or degrading the properties of adjacent low temperature layers. The high temperature gradients between different temperature layers are maintained until the product is extruded from the head. The parison is subsequently cooled to form a desired multi-layer article in which the individual layers are continuous, not degraded, and formed of resin having previously incompatible flow temperatures. The parison may be blow molded and cooled to form an article or used to make other multi-layered products. The thickness of the parison extruded from mouth 43 may be varied by modulating die pin 36 in a conventionally known manner to provide a parison for forming a blow molded article with essentially uniform thickness multi-layered walls. The variation in the thickness of the length of extruded parison blown to form a given article depends upon the blow ratio for the article at each point along the length of the parison.

The radial depth of steps 126, 130, 134 and 138 may be selected to increase the cross sectional area of channel 125 sufficiently to permit flow of the new outer layer into the channel while displacing the previously flowed layer or layers radially inwardly at the step. The radial depth of a given step is slightly greater than the radial width of passage 125 upstream of the step in order to compensate for the decrease in circumference of the previously flowed layer or layers as they are moved inwardly at the step. The steps are angled inwardly at 30 degrees approximately equal to the half angle of the transfer passages 116 to facilitate smooth flow of resin from the passages to the extrusion channel 125 and onto previously extruded resin in the channel.

Each resin layer flows into channel 125 at a pressure determined by the setting of the extruder flowing the resin to the module and measured at the module inlet. The relative thickness of the layers flowed into channel 125 may be changed by varying the paressures at which the separate resins are flowed into the channel. Pressure equilibration between a previously flowed layer or layers and a newly entering layer occurs as the newly flowed layer enters the channel. Increased delivery pressure increases the thickness of the delivered layer and relatively decreases the thickness of the previously extruded layer or layers. Reduced delivery pressure decreases the thickness of the newly delivered layer wile relatively increasing the thickness of the previously extruded layer or layers.

Figure 5:
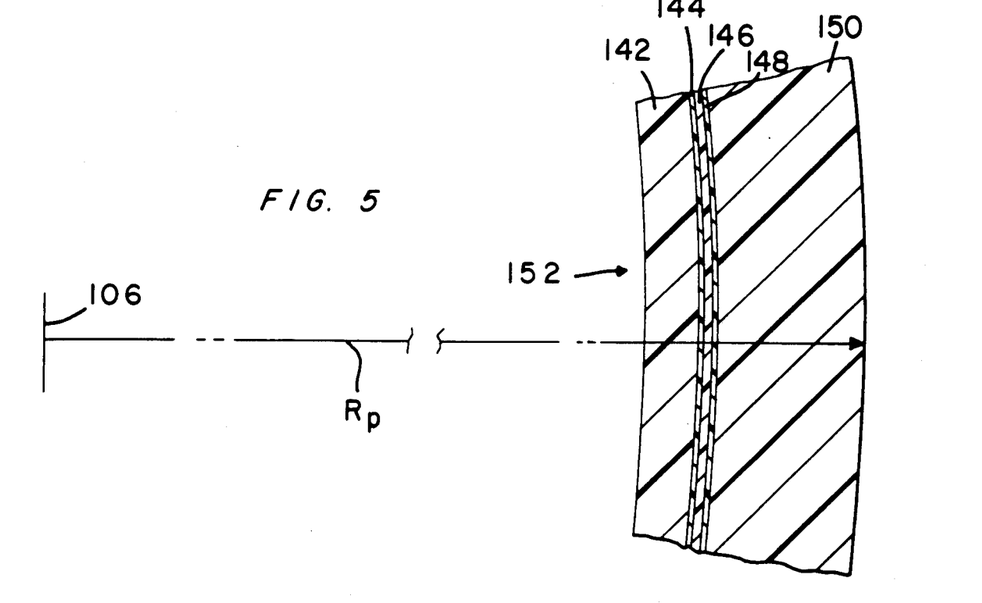
FIG. 5 is an enlarged partial sectional view of the intermediate product of FIGS. 4b to 4f.

In FIGS. 4b to 4f the inner and outer layers of the intermediate product are considerably thicker than the three interior layers. Inner structural layer 142 has a thickness of 0.024 inch; inner tie layer 144 has a thickness of 0.0015 inch; barrier layer 146 has a thickness of 0.003 inch; outer tie layer 148 has a thickness of 0.0015 inch and the outer structural layer 150 has a thickness of 0.060 inch with the intermediate product having a total thickness of 0.090 inch. The outer radius of the product, $R_p$, shown in FIG. 5 is one inch, the radius of bore 30. The radius of extrusion die mouth 43 is slightly less than ⅞ inch, smaller than the 1 inch radius of bore 30 so that the intermediate product is reduced in diameter as it flows from the mandrel through the accumulation recess 42, past the die pin 36 and out mouth 43. Modulation of pin 36 to vary the thickness of the resultant parison does not disturb the continuity or thickness of the layers of plastic in the downstream end of the intermediate product as it is extruded.

Bore 30 extending through head 10 has a constant radius, thereby enabling the individual cross head die modules to be used at different locations on the head and in different combinations depending upon the construction of a given head. For instance, head 10 could be converted to a four layer co-extrusion head by removing one of the modules and reclamping the remaining four modules between clamp plates 12 and 14. Alternatively, the head could be modified by adding an additional like module to extrude a six layer parison. In each case, an appropriate length stepped mandrel may have to be fitted.

The modular construction of head 10 also facilitates substituting modules with different flow paths as required. For instance, a relatively viscous resin or high delivery rate may require use of a module with an increased area cross section flow path. In some applications, a single module head may be used to extrude a mono-layer parison.

The extrusion head, whether extruding a multi-layer or mono-layer parison, is capable of extruding all extrudable thermal plastic resin materials including, for example, cellulose esters and ethers such as ethyl cellulose acetate, acetobutyrate, and acetopropionate; vinyl and vinylidene polymers and copolymers such as polymers and copolymers of vinyl chloride, vinyl acetate, vinyllidene chloride, polyvinyl alcohol, polyvinyl butyral; and polymers and copolymers of olefins, such as ethylene, propylene, and butylene; polymers and copolymers of styrene, 2-methyl styrene and their mixtures of elastomeric copolymers; polyamides, interpolyamides such as polyhexamethylene adipamide, polycaproloctam, polyundecanamide, polyhexamethylenesebacamide; polycarbonates; polyaldehydes, polyethers; polyurethanes; polyesters; natural and synthetic thermoplastic elastomers; thermoplastic fluorinated resins; silicon resins and thermoplastic elastomers and the like.

These thermoplastic resin materials can be used in admixture with fillers, plasticizers, colorants, or other ordinary additives, provided they do not prevent melt extrusion. Additionally, re-grind resin material formed by regrinding and melting the flash and other waste plastic formed in a blow molding operation may be extruded by the head.

In the preferred process of the invention, various thermoplastic materials such as those described above are combined to take advantage of the desirable properties of each thermoplastic material in the parison. These properties include mechanical strength, resistance to shock, thermal properties, transparency, opacity, barrier properties including resistance to chemicals, impermeability to liquids, gases, and odors, ease of working ability to receive printing or decoration, etc. The material may be located at a desired location in the parison to take full advantage of its properties.

The invention permits adhesive or tie resins to be extruded with high temperature resins and used to make otherwise unavailable parisons. For example a multilayered parison may be made having a mutually compatible adhesive or tie resin layer interposed between adjoining layers of thermoplastic resin which, without an interposed adhesive layer, would not normally adhere to each other. In this way it is possible to form multiple-layer products combining materials for their specific properties, irrespective of whether these materials are capable of being directly bonded to one another during coextrusion.

The pressures of resins flowed to the individual modules, as measured adjacent the inlet ports 52, vary as a function of a number of factors including the geometry of the module flow path, the thickness of the desired resin layer, the flow rate, flow temperature and the properties of the given resin. Polycarbonate resin is typically supplied to a module at an inlet pressure of about 4,000 to about 6,000 lbs. per square inch. Polypropylene resin may be supplied to the module at an inlet pressure from about 2,500 to about 4,000 pounds per square inch. Tie resins and barrier resins may be supplied at inlet pressures from about 2,000 to about 3,000 lbs. per square inch. These pressures are generally lower than the pressures at which comparable resins are supplied to the flow paths of conventional co-extrusion heads for forming blow molding parisons.

A first structure blow molded from a parison extruded by 10 head has an inner layer 0.0168 inch thick formed of a polycarbonate resin (Lexan 154, manufactured by General Electric Co.) a branched polycarbonate having an optimum flow temperature of about 585° F. The second layer 0.0016 inch thick is formed from an adhesive or tie resin (Admer VF500, manufactured by Mitsui PetroChemical Industries, Ltd., Tokyo, Japan) having an optimum flow temperature of about 385° F. The middle barrier layer is 0.0032 inch thick and is formed from a random copolymer of ethylene and vinyl alcohol (Eval-F, manufactured by Kurary Co., Ltd. and available in the United States from Evalca of America, Omaha, Nebr.) and having a flow temperature of about 385° F. The fourth layer is 0.0016 inch thick formed from an adhesive like the second layer having a flow temperature of about 380° F. The fifth and outer layer is 0.0168 inch thick formed from a polycarbonate resin like that forming the first or inner layer and having a flow temperature of about 585 degrees F. The structure has a total thickness of 0.040 inch. The flow temperature of the polycarbonate resin may vary from about 530° F. to about 585° F.

Head 10 forms the desired parison for blow molding the structure of FIG. 5 despite the approximately 200° F. difference in temperature between the optimum work or flow temperatures of the two outer and the three inner layers. The intermediate product flowing through head 10 to form the parison extruded and molded to form this structure includes continuous inner and outer layers at about 585° F. in contact with adjacent cooler layers at about 385° F. The temperature zoning properties of the head, the insulating properties of the resin and the rapid movement of the intermediate product along the mandrel and out the mouth of extrusion die 32 prevent degradation of the properties of the low temperature resin before the parison solidifies.

A second structure blow molded from a parison extruded by head 10 has an inner 0.012 inch thick layer formed from an extrusion grade polypropylene resin having a flow temperature of about 400° F. The second, third and fourth tie barrier, and tie layers correspond to the layers in the first structure and have flow temperatures about 385° F. The outer layer is 0.022 inch thick and formed from polycarbonate resin as used the first structure having a flow temperature of about 585° F. The structure has a total thickness of 0.04 inch. The flow temperature of the polypropylene may vary from between about 347° F. to about 410° F.

The third structure blow molded from a parison extruded by head 10 has an inner 0.014 inch thick layer formed from polypropylene resin as described in the second structure and having a flow temperature of about 400° F. The second tie layer is 0.0005 inch thick formed from a tie resin as described before and having a flow temperature of about 385° F. The central barrier layer is 0.001 inch thick and formed from a barrier material as previously described having a flow temperature of about 385° F. The outer tie layer is similar to the inner tie layer and the outer structural layer is 0.014 inch thick formed from a polypropylene resin as previously described having a flow temperature of about 400° F. The structure has a total thickness of 0.030 inch.

A 5-layered, polymeric resin parison is produced with a 5 module die head as described and shown in the accompanying drawings. In the No. 1 module (for laydown of the base layer upon the mandrel component) there is introduced a melt of a polycarbonate resin (LEXAN 154, General Electric Co.). In the following 4 modules, in sequence, there is introduced for subsequent lay-down, melts of a polyolefin resin tie layer (E-310K), a random copolymer of ethylene and vinyl alcohol (EVAL-F; Kuraray Co., Ltd., Evalca Co. of America, Omaha, NE), a second resin tie layer (Adner VF-600; an adhesive polyolefin; Mitsui Petrochemical Industries Ltd., Tokyo, Japan) and polypropylene. The individual modules are heated to a melt temperature for each resin material introduced and maintained at the temperature selected to deliver the resin under predetermined flow rates to the extrusion channel for sequential lay-down, forming the multi-layered parison. The total residence time of the base layer in the extrusion channel is about 1 second. The product parison is uniform in weight throughout the length, bubble free (to the naked eye) and there is no visible knit line. The product is obtained at a rate of 690 lbs/hour. The temperature of each module is given in the Table below with the approximate thickness of the layer extruded.

TABLE

| Module | Resin | Module Temperature °F. | Percent of Tube Thickness |
|---|---|---|---|
| 1 | Polycarbonate | 500° | 75 |
| 2 | E-310K | 426° | 5 |
| 3 | EVAL-F | 426° | 5 |
| 4 | VF-600 | 426° | 5 |
| 5 | Polypropylene | 400° | 10 |

Structures blow molded from this parison are similar to the structures described in the first three examples with layers having thicknesses proportional to the percentage thickness of the individual resins in the parison.

Head 10 forms the desired parison for blow molding the structure of FIG. 5 despite the approximately 200° F. difference in temperature between the optimum work or flow temperatures of the two outer and the three inner layers. The intermediate product flowing through head 10 to form the parison extruded and molded to form this structure includes continuous inner and outer layers at about 585° F. in contact with adjacent cooler layers at about 385° F. The temperature zoning properties of the head, the insulating properties of the resin and the rapid movement of the intermediate product along the mandrel and out of the mouth of extrusion die 32 prevent degradation of the properties if the low temperature resin before the parison cools.

Structures blow molded or manufactured from parisons extruded by head 10 are bubble free (to the naked eye) and have no degraded material or knit lines. All layers are continuous. The resin in each layer in these structures possesses all of the properties of the resin as if the layer had been extruded in a single layer parison. The properties of the resin are not impaired because of co-extrusion. In a five layer co-extrusion head, as described where the radius of the bore 30 is one inch, the parison may be extruded at a rate of about 350 to about 1,000 lbs./hour.

Figure 7:
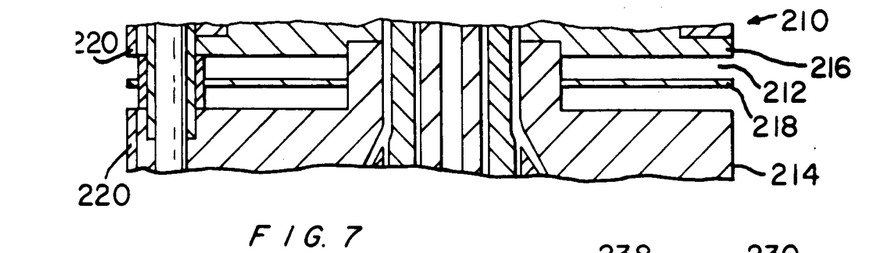
FIG. 7 is a sectional view of a second embodiment extrusion head similar to the head of FIGS. 1 through 3.

FIG. 7 illustrates a second embodiment modular co-extrusion head 210 similar to previously described first embodiment co-extrusion head 10. Head 210 is like previously described head 10 and includes five like cross head die modules, upstream and downstream clamp plates, a stepped mandril and an extrusion die as in head 10. The flow paths in the individual modules of head 210 are like those in head 10. Head 210 forms an intermediate product and parison like those formed by head 10 with the temperature zoning and other advantages as previously described.

In head 210 the annular air spaces or slots 212 between adjacent modules 214 and 216 provide a thermal break between the modules and permit removal of heat from one module as in head 10. The modules are not provided with copper envelopes. Thermal insulation discs 218 are provided in the centers of the airspaces between the modules as illustrated. The discs are supported in the airspaces. Isolation of the modules by the insulation discs 218 prevents the radiational and convectional transfer of thermal energy between the modules, which might otherwise result in undesirable temperature conditions in adjacent modules. Any known thermal insulating material with an operating temperature of at least 425° C. may be used as the insulation discs 218 such as fiberglass, asbestos and like materials in a self-supporting (rigid or semi-rigid) form. Insulating discs 214 should not fill the recess 212 since the air break is necessary. A filling placement of insulating material, such as fiberglass, within the annular recess 212 between the modules would not effectively zone the modules and could result in a degradation of any high temperature sensitive resins within a module adjacent to a module operating at a temperature degradative of the sensitive resin. Separation and thermal isolation of each module member in head 210, with air gaps and the insulative materials discs 218 allow for the effective removal of excess heat from within each module and close control of the separate and individual resin melt temperature at the point of extrusion into the extrusion channel of head 210. The thermal break avoids radiational heating of adjacent layers to help maintain the temperature differential between adjacent layers, as much as 270° F. This is obviously very important when adjacent resin layer materials require vastly different melt temperatures. Preferably, there is minimal surface contact area between the modules to avoid thermal transmission between modules. This feature of the apparatus of the invention is advantageous when adjacent layers of a multi-layered parison being extruded require substantially different temperature conditions for melt extrusion; particularly when one of the resins requires a temperature which would cause degradation of the adjacent resin being expressed into the extrusion channel and onto the mandrel. With inefficient temperature control, the extruded multi-layered parison product may be degraded to the point of reduced utility. For example, polycarbonate of a melt extrusion grade requires a temperature of a circa 527° F.–572° F. to achieve the proper melt viscosity for extrusion blow molding. To obtain a satisfactory lamination with a layer of pololefin such as polypropylene (extrusion melt temperature of circa 374° F.–410° F.) including an intervening layer of a tie resin such as ethylene-vinyl acetate copolymer, optimum viscosity and flow rates of each resin extrudate require close temperature control of each melt to avoid such problems as "woodgraining".

Figure 8:
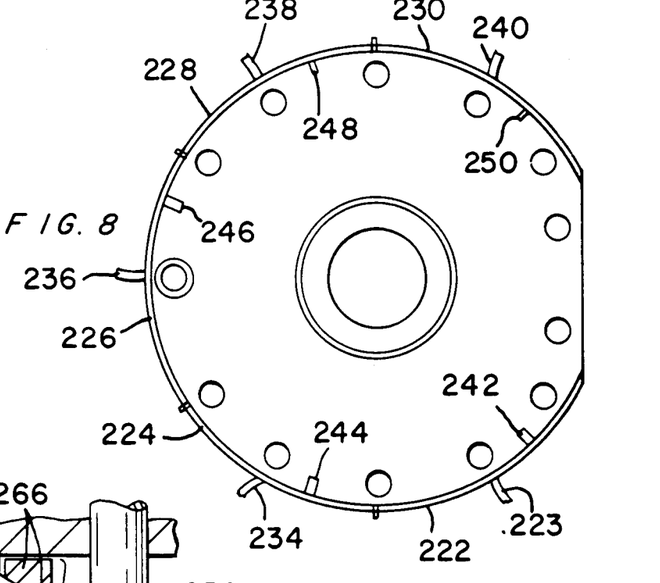
FIG. 8 is an elevational view of one disassembled module of another embodiment.

In head 210, each module is associated with individual means for heating the module to a temperature advantageous to the extrusion of a given resin layer. In head 210, each module is surrounded on the exterior with a resistance heater 220 like previously described heater 98. The resistance heater 220 is fitted in close contact with the outer peripheral wall of the annularly shaped module 18 so as to transfer thermal energy to the module by radiation and/or conduction. In another embodiment of the invention, the heating means of resistance heater 220 is divided into a plurality of separate heaters mounted on the module exterior so as to substantially encircle the module. The FIG. 8 is a view-from-above of the module, bearing such a heating means comprising a plurality of five resistance zone heaters 222, 224, 226, 228, and 230 together with separate electrical supply means 232, 234, 236, 238, and 240 for energizing the heater associated therewith. The heaters individually zone heat areas within each separate module to help balance flow within the individual module. The correct balance of thermal energy input from the heaters and thermal energy dissipation from the open annular slots or recesses 212 further assure temperature control of the modules so that resins with very different flow temperatures may be extruded through adjacent modules and onto the mandrel without degradation. The zone heater elements of the modules such as resistance heater elements 222-230 may be and preferably are individually energized and de-energized to maintain a pre-determined melt temperature in zones of the resin melt distribution channel in the module. Thermocouples such as thermocouples 242, 244, 246, 248, and 250 may be associated with each of the module zone heating elements as part of a conventional energizing and de-energizing electrical circuit to aid in the desired temperature control.

Figure 9:
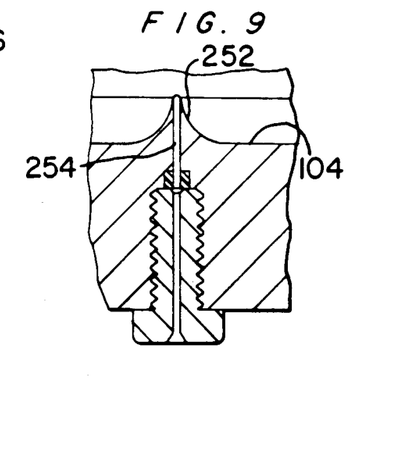
FIG. 9 is a sectional view illustrating part of the flow path of one module plate of the head of FIG. 8.

Preferably a blade divider mounted on the floor of the primary distribution channel of each module opposite the inlet passage splits the flow, one-half in each direction. Details are shown in FIG. 9, an enlarged view of the diverter 252 in place. A temperature sensor 254 may be emplaced to sense the temperature of the diverted resin. One-half of the resin will flow from the inert passage through each half of the distribution channel. Each half of the resin split will flow ultimately towards the mouth of the module. The divider may be movably positioned so as to adjust flow whereby more flow is directed in one half than in the other half, to compensate for imbalances in natural flow within the passage.

Figure 10:
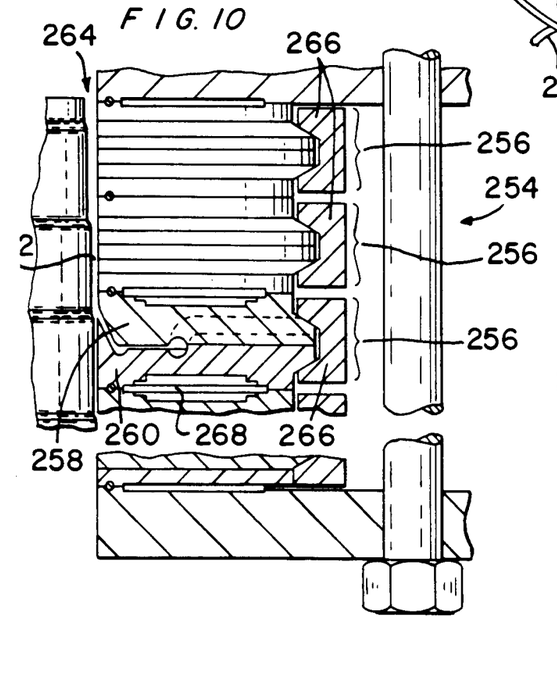
FIG. 10 is a partially broken away sectional view of another embodiment extrusion head according to the invention.

FIG. 10 is a cross-sectional side elevation of a portion of another embodiment extrusion head 254 of the invention wherein the modules are of a special and particular structure. As shown in the FIG. 10, each module 256 like the previously described modules, is made up of an upper plate 258 and a lower plate 260. Each plate 258, 260 is a generally planar body having a mutual mating surface with a central aperture 262 traversing the module body and together with adjacent module apertures forming an extrusion channel 264. Unlike the apparatus 10 and 210, adjacent upper and lower plates 258, 260 of each module are held together in sealing association within the vertically stacked modules by exterior clamps 266. The design of the assembly as shown in FIG. 10 has the distinct advantage of avoiding any kind of seal between the upper and lower die plates. In the apparatus of FIG. 10, resistance heating elements 268 are wholly contained within the assembled module element body rather than on an exterior surface such as in the case with the embodiment apparatus 10 and 210 described previously.

While we have illustrated and described preferred embodiments of our invention, it is understood that they are capable of modification, and we therefore do not wish to be limited to the precise details set forth, but desire to avail ourselves of such changes and alterations as fall within the purview of the following claims.

What we claim as our invention is:

1. A modular extrusion head for extruding parisons of synthetic, polymeric resins, which comprises;
   (A) a plurality of die block modules assembled in a stack having first and second ends to form a die body for the head, each of the die block modules comprising:
     (1) an upper die plate, having
       (i) an upper surface;
       (ii) a lower surface;
       (iii) a peripheral edge defining the outer perimeter of the plate and extending between the upper surface and the lower surface; and
       (iv) a bore providing open communication between the upper and lower surfaces; and
     (2) a lower die plate, having
       (i) an upper surface;
       (ii) a lower surface;
       (iii) a peripheral edge defining the outer perimeter of the lower die plate and extending between the upper surface and the lower surface; and
       (iv) a bore providing open communication between the upper surface and the lower surface of the lower die plate;
   the lower surface of the upper die plate and the upper surface of the lower die plate being adapted by size and configuration to mate with each other and form therebetween a thermoplastic resin melt distribution channel;
   said upper die plate and lower die plate being removably assembled together whereby the channel is formed and the bore of the upper die plate is in axial alignment with the bore of the lower die plate, forming a segment of an extrusion channel of substantially uniform diameter piercing the die block assembly;
   the segments of the plurality of assembled modules together forming a continuous extrusion channel of substantially uniform diameter, open at top and bottom of the module assembly and open into each distribution channel of each module in the assembled modules through an annular orifice about the aperture;
   each of said resin melt distribution channels being radially disposed about the periphery of the extrusion channel segment and extending distally from the periphery of the extrusion channel to a line describing a circle;
   (B) melt supply means between a melt source and each distribution channel for supplying melted, synthetic, thermoplastic, polymeric resin to the channel under uniform pressure;
   (C) temperature control means associated with each module for maintaining a pre-determined resin temperature in each module;

(D) means for maintaining the plurality of stacked modules in sealing association with each other;

(E) a first terminal die plate for capping a first end of the stack;

(F) a second terminal die plate for capping the second end of the stack;

(G) a mandrel fixed in the extrusion channel and having a first end, a second end and a tapered body joining together the first and second ends thereof, said tapered body being spaced apart from the modules forming the extrusion channel to form an extrusion passageway in open communication with the annular orifice opening into each distribution channel; and (H) fluid conduit means passing through the central portion of the mandrel.

2. The head of claim 1 which includes fluid sealing means disposed annularly about the central bore of the assembled upper and lower die plates.

3. The head of claim 1 wherein the upper surface of the upper die plate bears an upward projecting flange about the bore therein and the lower surface of the lower die plate bears a recess about the bore therein, said flange being of a size and configuration to interconnect with the recess in the adjacent module.

4. The head of claim 3 wherein the temperature control means comprises an annular recess between each of the assembled modules, open at the outer periphery of the modules and extending inwardly toward the flange between modules.

5. The head of claim 4 wherein a thermal insulating disc is suspended in said recess between modules.

6. The head of claim 4 wherein the temperature control means further comprises heater means mounted in association with each module.

7. The head of claim 6 wherein the heater means is mounted on the peripheral edge of the upper and lower die plates.

8. The head of claim 7 wherein the heater means comprises a plurality of zone heaters.

9. The head of claim 1 wherein the body of the mandrel is tapered in a series of steps, the number and length of each step corresponding to the number of modules and the length of the extrusion channel segment.

10. The head of claim 9 wherein each mandrel step is positioned opposite an orifice or a distance upstream of the extrusion direction equal to the thickness of the resin layer to be placed on the mandrel from said orifice.

11. The head of claim 9 wherein the steps are curved.

12. A thermoplastic resin extrusion head having elongate bore; an outer circumference surrounding the bore; an extrusion die at one end of the bore; a mandrel mounted on the head and extending freely in the bore to define an annular extrusion channel running along the bore to the extrusion die; a plurality of individual cross head dies spaced apart along the channel, each cross head die having a resin inlet on the circumference of the head, an annular mouth extending around the bore and opening into the channel and a flow passage connecting the inlet and mouth including a circumferential portion surrounding the bore and connected to the mouth so that resin supplied to the inlet flows through the passage, out the mouth and along the extrusion channel in an annular layer; a radially narrow neck separating adjacent cross head dies, the interior surface of each neck forming part of the bore and the exterior surface of the neck being located radially inwardly of the circumference of the head; and an annular air space located between the adjacent cross head dies and extending around the neck and outwardly from the neck to the circumference of the head whereby the air space zones adjacent cross head dies so that the temperature of the resin flowing through one cross head die is independent of the temperature of the adjacent cross head die and dissipates heat by convection cooling.

13. A head as in claim 12 wherein the air space is open at the circumference of the head.

14. A head as in claim 13 wherein the outer surface of the neck defines the inner wall of the air space, and such surface and the circumferential portion of the flow passage are located approximately the same radial distance from the axis of the mandrel.

15. A head as in claim 14 wherein the circumferential portion comprises a circlar equilibration chamber.

16. A head as in claim 14 wherein each cross head die includes a circumferential heater and an exterior thermally conductive envelope extending from the heater radially inwardly along the air space to the neck.

17. A head as in claim 12, including spaced apart upstream and downstream clamp plates with the bore extending through the downstream clamp plate and a pair of like cross head die modules stacked between the clamp plates, said air space being located between the modules.

18. A head as in claim 12 wherein the mandrel includes a radial step at each mouth.

19. A head as in claim 18 wherein the portions of the mandrel between the steps are cylindrical.

20. A head as in claim 12 including heat shield means in the air space for preventing radiational transfer of thermal energy between adjacent dies.

21. A head as in claim 20 wherein each heat shield means comprises an insulating disc centrally located in the air space.

22. A head as in claim 12 wherein each flow passage includes a transfer passage ending at the mouth, the transfer passage having a uniform flow cross section along its length.

23. A head as in claim 22 wherein the transfer passages extend from the circumferential portions to the mouths and are generally conical.

24. A modular thermoplastic resin extrusion head comprising:

A. Spaced apart upstream and downstream clamp plates with a cylindrical plate bore extending through the downstream clamp plate;

B. At least two like cross head die modules stacked between the clamp plates, each module including:
1. Upstream and downstream module plates with an interface between the plates,
2. A cylindrical bore extending through the module plates and interface,
3. A flow inlet on the outer circumference of the module,
4. An annular flow mouth at the intersection of the interface and the bore, and
5. A flow passage in the module communicating the inlet and mouth;

C. The module bores and plate bore being aligned to form an elongate cylindrical bore;

D. A mandrel mounted on the upstream clamp plate and extending downstream therefrom in the cylindrical bore past the module mouths;

E. The mandrel and bore defining an extrusion channel extending from the mouth of the module adjacent the upstream clamp plate through the module adjacent the downstream clamp plate;

F. Means for forming a temperature break between each adjacent pair of modules and for dissipating excess module heat, such means extending annularly around the extrusion channel and radially outwardly from adjacent the channel to the circumference of the modules;

G. Whereby said means prevents heat supplied to one module from raising the temperature of the adjacent module above the optimum flow temperature of a low temperature resin flowing through the adjacent module and allows cooling of the modules.

25. A head as in claim 24 wherein the means comprises an annular air space surrounding the channel between adjacent modules.

26. A head as in claim 25 wherein the air space is open at the circumference of the modules.

27. A head as in claim 26 including a conductive envelope on the exterior walls defining the air space and the outer circumference of the modules and including a heater in contact with the envelope on the outer circumference of the modules whereby the envelope conducts heat from the heater radially inwardly along the modules and conducts heat to the air space.

28. A head as in claim 24 including a neck separating adjacent modules and surrounding the channel, and wherein said means comprises an open annular air space between the modules defined by the neck and spaced walls of the modules extending radially outwardly of the neck.

29. A head as in claim 28 including a heater on the outer circumference of each module, and a conductive envelope on the exterior module walls in thermal contact with the heater.

30. A head as in claim 28 including means mounted on the circumference of each module for supplying heat to the module to heat the flow passage in the module at an optimum flow temperature for resin flowed through the module.

31. A head as in claim 20 including radially narrow necks joining each clamp plate to the adjacent module and open annular air spaces between the clamp plates and adjacent modules.

32. A thermoplastic resin cross head die comprising:
  A. An upstream die plate, a downstream die plate and means for securing the plates together at an interface;
  B. A cylindrical bore extending through the plates at the interface;
  C. A resin flow inlet on the outer circumference of the die away from the bore;
  D. An annular mouth extending around the bore at the interface;
  E. A resin flow passage communicating the inlet and mouth and including at the interface:
    1. An equilibration ring spaced radially outwardly from the bore and having a circumferential length greater than the circumferential length of the mouth;
    2. A transfer passage extending around the bore and joining the circumferential length of the equilibration ring to the circumferential length of the mouth; and
    3. The transfer passage having constant cross sectional flow area to resin flowing along the passage from the ring to the mouth;
  F. Whereby the temperature of resin flowing from the ring to the mouth is not altered by the geometry of the transfer passage.

33. A die as in claim 32 wherein the transfer passage extends simultaneously (1) inwardly toward the bore and (2) axially along the bore.

34. A die as in claim 33 wherein said transfer passage is generally conical in shape.

35. A die as in claim 34 wherein the half angle of the transfer passage is approximately 30 degrees.

36. A die as in claim 32 wherein the width of the transfer passage increases smoothly from the ring to the mouth.

* * * * *

UNITED STATES PATENT AND TRADEMARK OFFICE
CERTIFICATE OF CORRECTION

PATENT NO. : 4,798,526
DATED : January 17, 1989
INVENTOR(S) : Milton Briggs et al It is certified that error appears in the above—identified patent and that said Letters Patent is hereby corrected as shown below:

In the Drawings:

Figure 7, upper left hand corner, change the reference number to read --220--.

Figure 8, at the lower right hand corner, change "223" to --232--.

Figure 10, at the left margin, change "2" to --262--; and at the right margin, change "254" to --254'--.

In the Specification:

Column 8, line 17, change change "equilibraion" to --Equilibration--.

Column 15, line 54, change "254" to --254'--.

Signed and Sealed this

Sixth Day of March, 1990

Attest:

JEFFREY M. SAMUELS

Attesting Officer          Acting Commissioner of Patents and Trademarks